(12) United States Patent
Takekawa

(10) Patent No.: US 7,741,745 B2
(45) Date of Patent: Jun. 22, 2010

(54) ATTACHING STRUCTURE OF RESOLVER, DYNAMO-ELECTRIC MACHINE AND ATTACHING METHOD OF RESOLVER

(75) Inventor: Junya Takekawa, Tochigi (JP)

(73) Assignee: Showa Corporation, Gyoda-Shi (JP)

( * ) Notice: Subject to any disclaimer, the term of this patent is extended or adjusted under 35 U.S.C. 154(b) by 562 days.

(21) Appl. No.: 11/224,520

(22) Filed: Sep. 12, 2005

(65) Prior Publication Data

US 2006/0220481 A1    Oct. 5, 2006

(30) Foreign Application Priority Data

Mar. 29, 2005    (JP) ............................. 2005-096367

(51) Int. Cl.
*H02K 7/09*    (2006.01)
(52) U.S. Cl. .................. 310/90.5; 310/323.21; 310/51; 310/68 R
(58) Field of Classification Search ................. 310/90.5, 310/323.21, 51, 68 R; *H02K 7/09*
See application file for complete search history.

(56) References Cited

U.S. PATENT DOCUMENTS

| | | | | |
|---|---|---|---|---|
| 4,617,484 A | * | 10/1986 | Buijsen | 310/51 |
| 5,027,026 A | * | 6/1991 | Mineta et al. | 310/216.127 |
| 5,491,370 A | * | 2/1996 | Schneider et al. | 310/54 |
| 5,619,389 A | * | 4/1997 | Dunfield et al. | 360/98.07 |
| 5,694,268 A | * | 12/1997 | Dunfield et al. | 360/98.07 |
| 5,798,887 A | * | 8/1998 | Yoshida et al. | 360/99.08 |
| 5,914,548 A | * | 6/1999 | Watanabe et al. | 310/88 |
| 5,949,613 A | * | 9/1999 | Moir et al. | 360/99.08 |
| 6,013,960 A | * | 1/2000 | Yoshida | 310/68 B |
| 6,137,196 A | * | 10/2000 | Kurasawa | 310/51 |
| 6,608,734 B1 | * | 8/2003 | Herndon et al. | 360/99.08 |
| 2003/0048574 A1 | * | 3/2003 | Khan et al. | 360/99.08 |
| 2003/0086203 A1 | * | 5/2003 | Khan | 360/99.08 |
| 2004/0051404 A1 | * | 3/2004 | Kurosawa et al. | 310/49 R |

FOREIGN PATENT DOCUMENTS

| | | |
|---|---|---|
| JP | 2543173 | 4/1997 |
| JP | 2002-136055 | 5/2002 |

* cited by examiner

*Primary Examiner*—Quyen Leung
*Assistant Examiner*—John K Kim
(74) *Attorney, Agent, or Firm*—Osha • Liang LLP

(57) ABSTRACT

A resolver stator portion is attached to a resolver stator portion side attaching portion formed at a position facing to a resolver rotor portion via an elastic ring. Thus, it is possible to absorb a dimensional error of the resolver stator portion side attaching portion on the basis of an elastic deformation of the elastic ring even in the case that the dimensional error is generated in the resolver stator portion side attaching portion.

15 Claims, 7 Drawing Sheets

ATTACHING STRUCTURE OF RESOLVER, DYNAMO-ELECTRIC MACHINE AND ATTACHING METHOD OF RESOLVER

BACKGROUND OF THE INVENTION

1. Field of the Invention

The present invention relates to an attaching structure of a variable reluctance (VR) type resolver detecting a rotational position of a rotor, and a dynamo-electric machine provided with the attaching structure of the resolver, and an attaching method of the resolver.

2. Description of the Related Art

As shown in FIG. 7, a conventional DC brushless motor 100 is provided with a resolver rotor portion 104 attached to a shaft 102, a resolver stator portion 106 arranged in an outer side in a diametrical direction of the resolver rotor portion 104, and a coil portion 108 positioned in both sides in an axial direction of the resolver stator portion 106. A rotational position of the shaft 102 is detected by the resolver rotor portion 104 and the resolver stator portion 106.

In this case, the resolver stator portion 106 and the coil portion 108 are received in a case member 110. The case member 110 is arranged in a concave portion 116 of a resolver stator portion side attaching portion 114 formed in a housing 112. A positioning groove 118 having a bottom surface portion 118A and a vertical surface portion 118B is formed in an inner peripheral surface of the concave portion 116. In a state in which the case member 110 is arranged in the concave portion 116, an outer side surface 106C in a diametrical direction of the resolver stator portion 106 is brought into contact with the bottom surface portion 118A, and a side surface 106B in one side in an axial direction of the resolver stator portion 106 is brought into contact with the vertical surface portion 118B. Further, a cover member 120 is attached to the resolver stator portion side attaching portion 114 by a bolt 122. In a state in which the cover member 120 is attached to the resolver stator portion side attaching portion 114, the cover member 120 is brought into contact with the side surface 106C in the other side in the axial direction of the resolver stator portion 106.

As the attaching structure of the resolver, there are structures disclosed in Japanese Patent Application Laid-open No. 2002-136055 (patent document 1) and Japanese Utility Model No. 2543173 (patent document 2).

In the structure in which the outer side surface in the diametrical direction of the resolver stator portion is brought into contact with the bottom surface portion, and the side surface in one side of the resolver stator portion is brought into contact with the vertical surface portion, an accuracy of assembling position is lowered with respect to the resolver rotor portion of the resolver stator portion in the case that a dimensional error of the concave portion is generated. Accordingly, there is a problem that a rotational position of the shaft cannot be accurately detected. In particular, in the case that both side end surfaces of the resolver stator portion are pinched by the vertical surface portion of the concave portion of the resolver stator portion side attaching portion and the cover member so as to be positioned and firmly fixed, a magnetic strain caused by a great fastening force is generated in the resolver stator core by a fastening member of the cover member, so that there is a problem that an accuracy of detection is diminished.

SUMMARY OF THE INVENTION

One or more embodiments of the present invention provide an attaching structure of a resolver which can prevent an accuracy of assembling position from being lowered with respect to a resolver rotor portion of a resolver stator portion, a dynamo-electric machine, and an attaching method of the resolver.

In accordance with one or more embodiments of the present invention, there is provided an attaching structure of a resolver for attaching the resolver detecting a rotational angle of a motor to the motor. A rotor of the resolver is attached to a shaft of the motor. A stator of the resolver is attached to an attaching portion formed at a position facing to the rotor via a dimensional error absorbing means for absorbing a dimensional error of the attaching portion.

In accordance with one or more embodiments of the present invention, there is provided a dynamo-electric machine having a resolver detecting a rotational angle comprising: a rotatably provided shaft; a rotor of the resolver attached to the shaft; and a stator of the resolver attached to an attaching portion formed at a position facing to the rotor via a dimensional error absorbing means.

In accordance with one or more embodiments of the present invention, there is provided an attaching method of a resolver for attaching the resolver detecting a rotational angle of a motor to the motor. A stator of the resolver is attached to an attaching portion formed at a position facing to a rotor of the resolver via a dimensional error absorbing means, and a dimensional error of the attaching portion is absorbed by the dimensional error absorbing means.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Next, a description will be given of a dynamo-electric machine in accordance with embodiments of the present invention with reference to the accompanying drawings.

The following description will be given exemplifying a DC brushless motor as the dynamo-electric machine, however, the present invention is not limited to the DC brushless motor. Instead, the present invention can be employed in various dynamo-electric machines, for example, direct-current type and alternating-current type step motors and the like.

Figure 1:
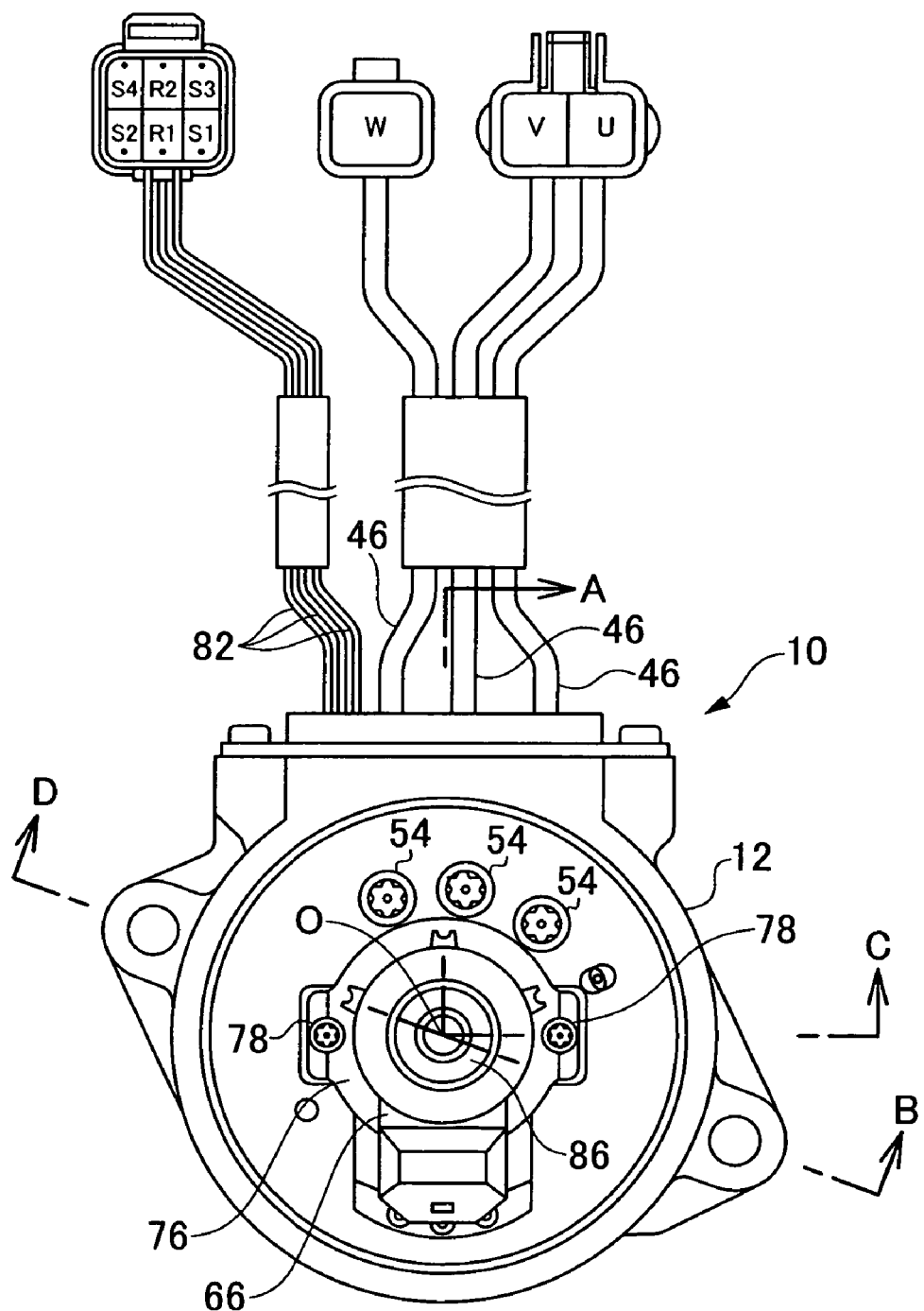
FIG. 1 is a right side elevational view of a dynamo-electric machine in accordance with an embodiment of the present invention.
Figure 2:
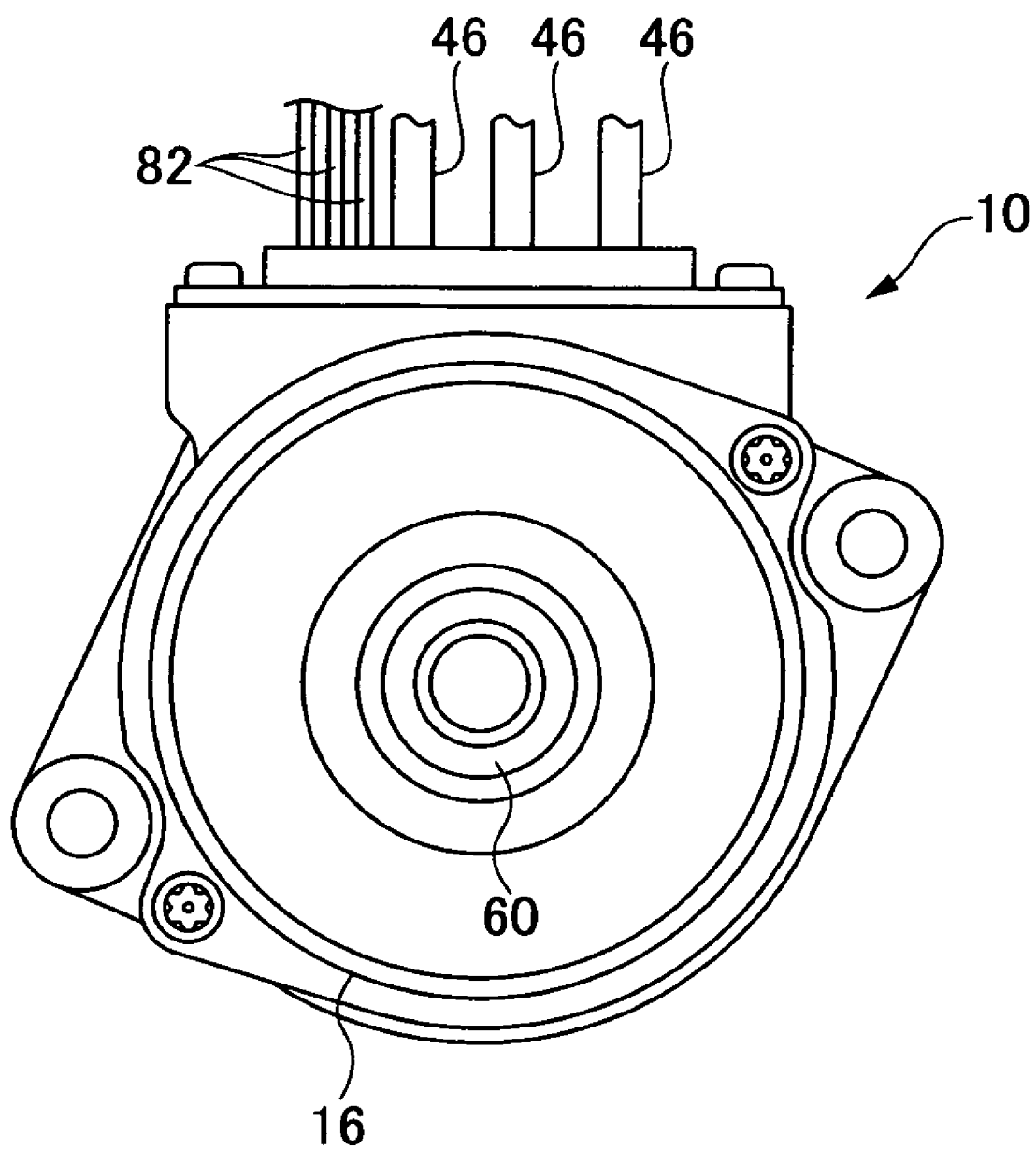
FIG. 2 is a left side elevational view of the dynamo-electric machine in accordance with an embodiment of the present invention.
Figure 3:
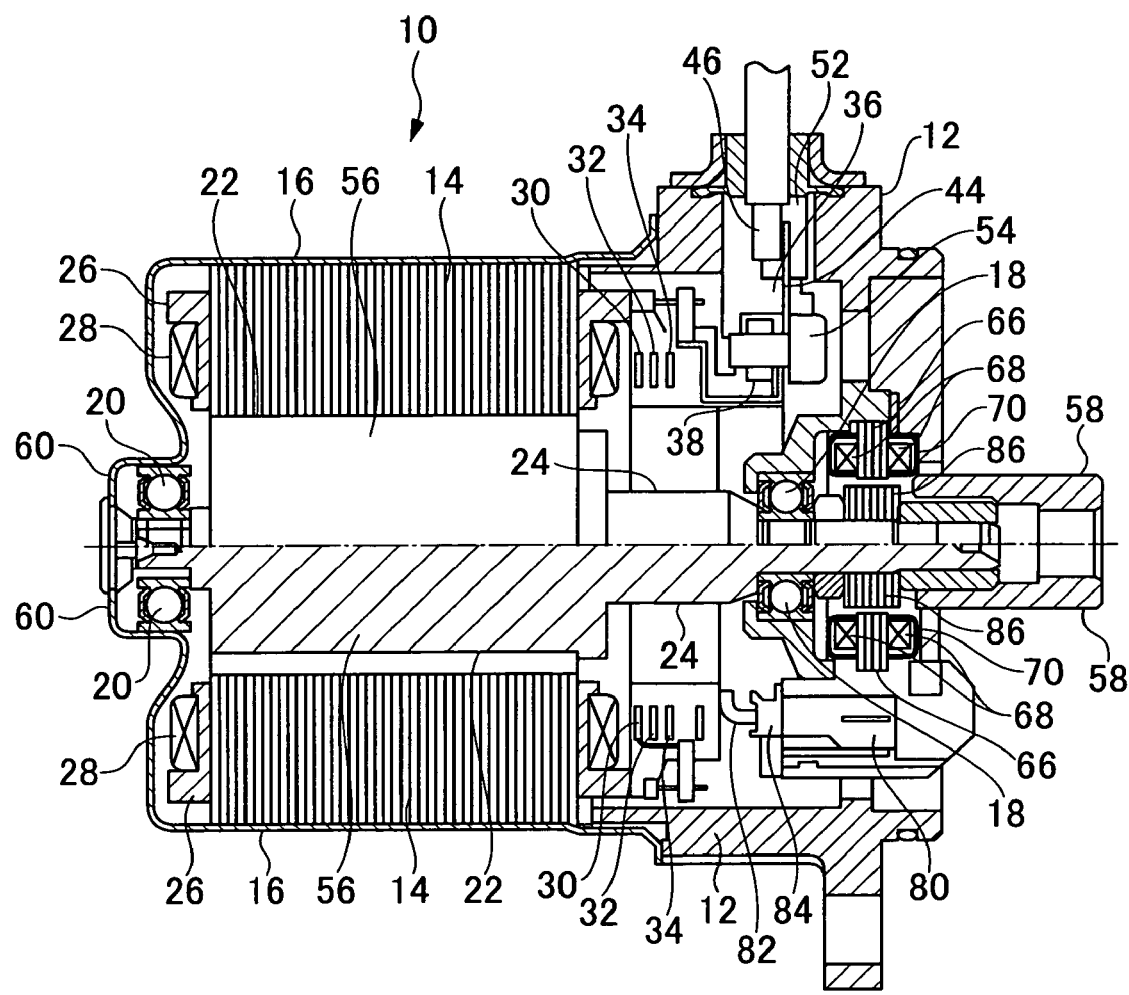
FIG. 3 is a cross sectional view, in which an upper half view is a cross sectional view along a line O-A in FIG. 1 and a lower half view is a cross sectional view along a line O-B in FIG. 1.

As shown in FIGS. 1 to 3, a motor 10 is structured by fitting a frame 16 in which a cylindrical stator 14 is received to a housing 12 made of an aluminum material or the like. A first bearing 18 is provided in the housing 12, a second bearing 20 is provided in the frame 16, and a shaft 24 of a rotor 22 is held by the first bearing 18 and the second bearing 20, whereby the rotor 22 can be rotated.

Further, the stator 14 is formed by laminating a silicon steel plate, and a motor coil 28 is wound around the stator 14 via a resin slot INS (insulating material) 26. The motor coil 28 is constituted by three layers comprising a U-phase, a V-phase and a W-phase, which are respectively bonded to a terminal 30, a terminal 32 and a terminal 34 in accordance with a fusing.

Further, three nuts 38 and three terminals 44 corresponding to the U-phase, the V-phase and the W-phase are provided in the resin base 36 positioned near each of the terminals 30, 32 and 34.

The terminals 44 and terminals 52 attached to leading ends of motor lead wires 46 of the U-phase, the V-phase and the W-phase are connected by screws 54, using the nuts 38, whereby the motor coil 28 and a control circuit in an external portion are electrically connected.

Further, the rotor 22 is structured such that a magnet 56 generating a magnetic field is attached to a shaft 24 constituted by a magnetic material such as an iron or the like in accordance with an adhesive bonding or the like. Further, a protection tube (not shown) is covered on an outer side surface of the magnet 56.

Further, a boss 58 made of a magnetic material such as an iron or the like is pressure inserted to an end portion in the housing 12 side of the shaft 24. The boss 58 functions as a coupling transmitting a driving force of the motor 10 to an external mechanism.

Further, an outer ring portion of the first bearing 18 in the housing 12 side is fixed to the housing 12 by caulking or the like.

Further, the stator 14 is pressure inserted to a cup-shaped frame 16 manufactured by drawing an iron plate, and a bearing box 60 for holding the second bearing 20 is formed in an end portion of the frame 16.

Figure 4:
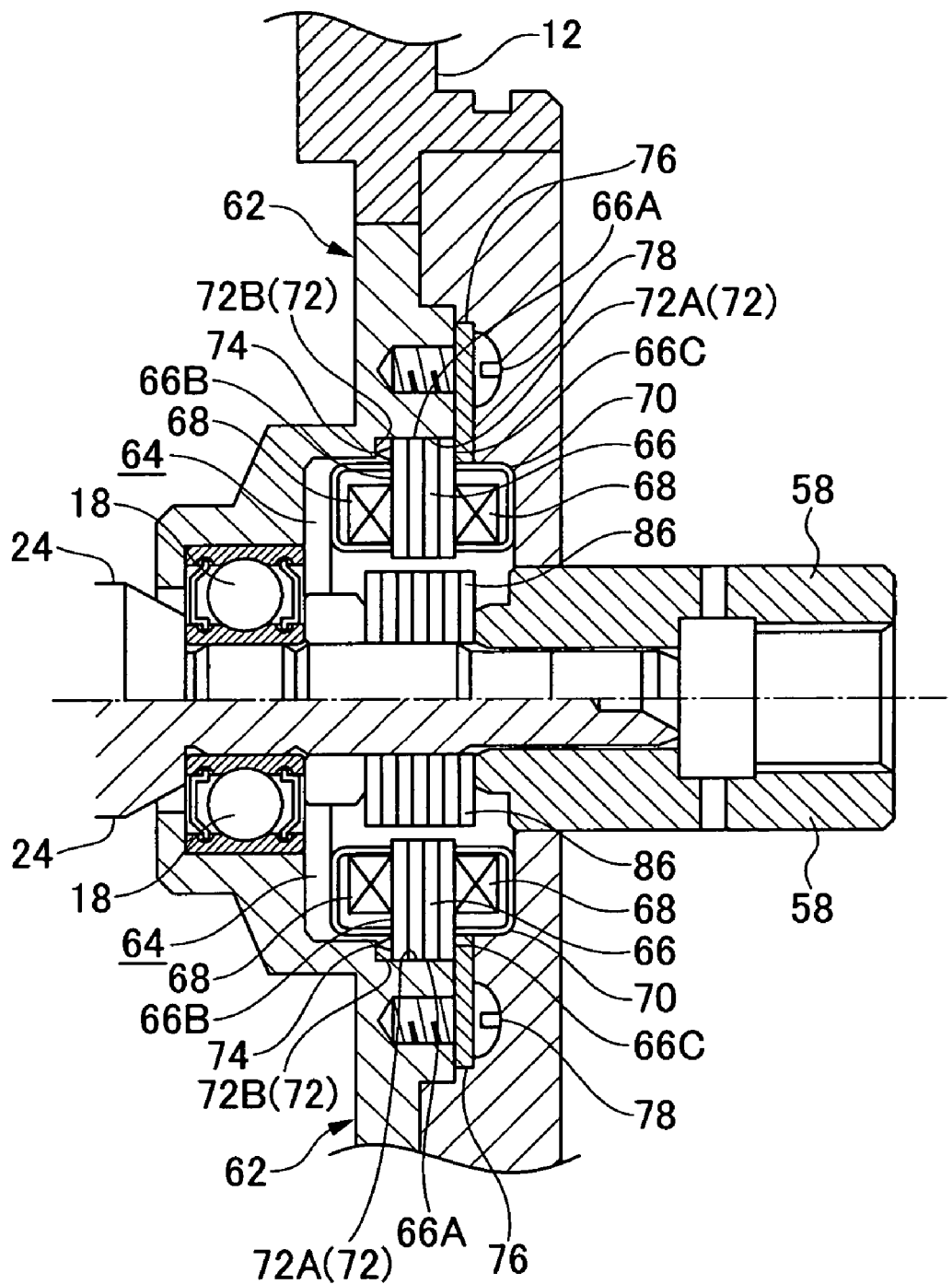
FIG. 4 is a cross sectional view showing a main portion of the dynamo-electric machine in accordance with an embodiment of the present invention, in which an upper half view is a partial cross sectional view along a line O-C in FIG. 1 and a lower half view is a partial cross sectional view along a line O-D in FIG. 1.

Further, as shown in FIGS. 3 and 4, a resolver stator portion side attaching portion (an attaching portion) 62 is formed in the housing 12. A concave portion 64 is formed in the resolver stator portion side attaching portion 62. Further, in the concave portion 64, there is arranged a case member 70 to which a resolver stator portion (a resolver) 66 serving as a sensor detecting a rotational position of the rotor 22, and a coil portion 68 arranged in a shaft axial direction of the resolver stator portion 66 are attached.

Specifically, a positioning groove 72 for supporting and positioning the resolver stator portion 66 on the same axis as the rotor 86 side of the shaft 24 is formed in an inner peripheral surface of the concave portion 64. In the positioning groove 72, there are formed a bottom surface portion 72A brought into contact with an outer side surface 66A in a diametrical direction of the resolver stator portion 66, and a vertical surface portion 72B extending in an approximately orthogonal direction to the bottom surface portion 72A and toward an inner side in the diametrical direction. Further, a side surface 66B in one side in an axial direction of the resolver stator portion 66 is brought into contact with the vertical surface portion 72B via an elastic ring 74 made of metal or rubber.

Further, a cover member 76 is attached to the resolver stator portion side attaching portion 62, for example, by a bolt 78. In a state in which the cover member 76 is attached to the resolver stator portion side attaching portion 62, the cover member 76 is brought into contact with a side surface 66C in the other side in an axial direction of the resolver stator portion 66.

As mentioned above, in a state in which the case member 70 is arranged in the concave portion 64 of the resolver stator portion side attaching portion 62, and the cover member 76 is attached to the resolver stator portion side attaching portion 62, the outer side surface 66A in the diametrical direction of the resolver stator portion 66 is brought into contact with the bottom surface portion 71A, the side surface 66B in one side in the axial direction of the resolver stator portion 66 is brought into contact with the vertical surface portion 72B via the elastic ring 74, and the side surface 66C in the other side in the axial direction of the resolver stator portion 66 is in a state of being in contact with the cover member 76.

Further, the resolver stator portion 66 is provided with a laminated plate (not shown) manufactured by laminating plates made of a silicon steel plate or the like, and having a hollow circular outer shape, and is provided with eight teeth (not shown) for applying a coil winding in an inner peripheral surface, and one set of exciting windings and two sets of output windings are wound around the teeth via an insulating body (not shown).

Further, the resolver stator portion 66 is provided with a male side connector 80 for connecting signal. To the male side connector 80, there is connected a female side connector 84 to which a sensor lead wire 82 for electrically connecting the control circuit in the external portion and the resolver is attached.

Further, a resolver rotor portion (a resolver) 86 is attached to the shaft 24. The resolver rotor portion 86 is arranged at a position facing to the resolver stator portion 66. Accordingly, the resolver rotor portion 86 is rotated together with the rotation of the shaft 24, and a reluctance between the resolver stator portion 66 and the resolver rotor portion 86 is changed.

As mentioned above, in accordance with the motor 10 mentioned above, a sine wave is applied to a portion between the exciting windings of the resolver stator portions 66 by the exciting circuit in the external portion in a state in which the resolver is assembled in the motor 10. In this case, when the resolver rotor portion 86 attached to the shaft 24 of the motor 10 is rotated, the reluctance between the resolver rotor portion 86 and the resolver stator portion 66 is changed, and there are generated a change of amplitude of an output voltage from two sets of output windings of the resolver stator portion 66 and a change of phase with respect to the exciting signal. The change of amplitude of the output voltage from two sets of output windings is shifted at a phase of 90 degree. It is possible to determine an angle of rotation of the rotor 22 by detecting with the output voltage signal detecting circuit and processing the signal. The motor 10 is driven by applying a predetermined pattern of current to the U-phase, V-phase and W-phase motor coils 28 by means of the driving circuit in the external portion.

Next, a description will be given of an operation of the dynamo-electric machine in accordance with an embodiment of the present invention.

As shown in FIGS. 3 and 4, since the elastic ring 74 is interposed between the vertical surface portion 72B constituting the concave portion 64 of the resolver stator portion side attaching portion 62 and the side surface 66B in one side of the resolver stator portion 66, even in the case that the dimensional error is generated in the bottom surface portion 72A or/and the vertical surface portion 72B constituting the concave portion 64, it is possible to fasten and fix the case member 70 to the cover member 76 by appropriately elastically deforming the elastic ring 74 without regulating a fastening degree by the bolt 78 point by point at a time of arranging the case member 70 provided with the resolver stator portion 66 and the coil portion 68 in the concave portion 64 of the resolver stator portion side attaching portion 62 so as to attach by the cover member 76. Accordingly, it is possible to absorb the dimensional error of the bottom surface portion 72A or/and the vertical surface portion 72B on the basis of an elastic deformation of the elastic ring 74. As a result, even in the case that the dimensional error is generated to some extent in the bottom surface portion 72A or/and the vertical surface portion 72B constituting the concave portion 64, it is possible to prevent the positional accuracy of the resolver stator portion 66 and the coil portion 68 from being extremely lowered with respect to the resolver rotor portion 86, and it is possible to accurately detect the rotational angle of the motor 10 (the shaft 24).

In this case, since it is possible to elastically deform the elastic ring 74 by constructing the elastic ring 74 of an elastic member, it is possible to absorb the dimensional error of the bottom surface portion 72A or/and the vertical surface portion 72B. Further, it is possible to utilize the existing O-ring, wave ring, or the like as it is by constructing the elastic ring 74 by metal or rubber. In particular, since an elastic deforming amount becomes large when using the rubber as the elastic material, it is possible to absorb the large dimensional error of the bottom surface portion 72A or/and the vertical surface portion 72B.

Figure 5:
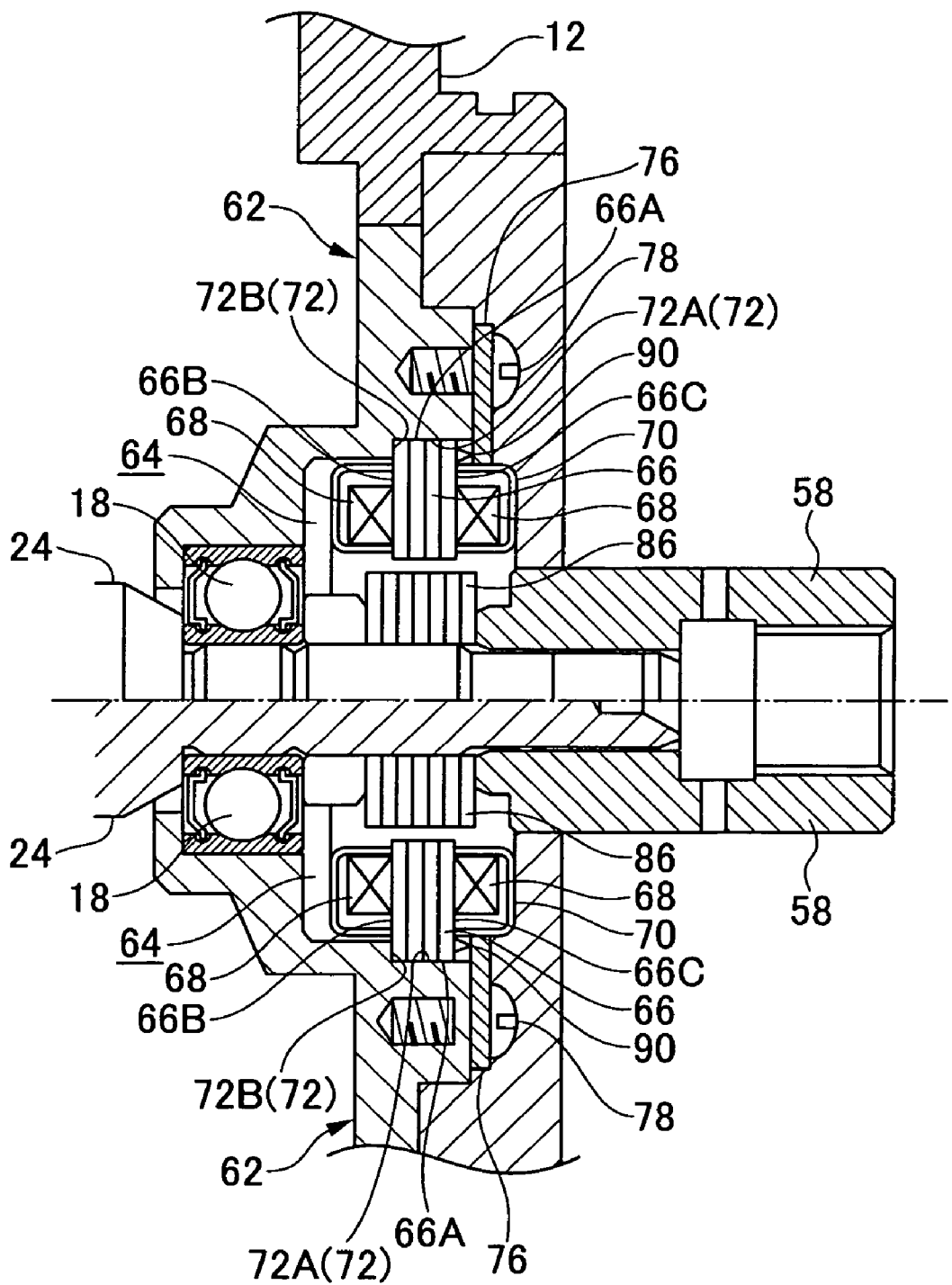
FIG. 5 is a partial cross sectional view showing a modified embodiment of the main portion of the dynamo-electric machine in accordance with an embodiment of the present invention.

In this case, in the embodiment mentioned above, the description is given by exemplifying the structure in which the elastic ring 74 is interposed between the vertical surface portion 72B constructing the concave portion 64 of the resolver stator portion side attaching portion 62 and the side surface 66B in one side of the resolver stator portion 66, however, the structure is not limited to this structure. The structure may be made, for example, as shown in FIG. 5, such that an elastic ring 90 is interposed between the cover member 76 and the side surface 66C in the other side of the resolver stator portion 66. In accordance with the structure mentioned above, in the case that the dimensional error is generated in the bottom surface portion 72A or/and the vertical surface portion 72B constructing the concave portion 64, it is also possible to prevent the positional accuracy of the resolver stator portion 66 and the coil portion 68 from being lowered with respect to the resolver rotor portion 86, by elastically deforming the elastic ring 90, and it is possible to accurately detect the rotational angle of the motor 10 (the shaft 24).

Figure 6:
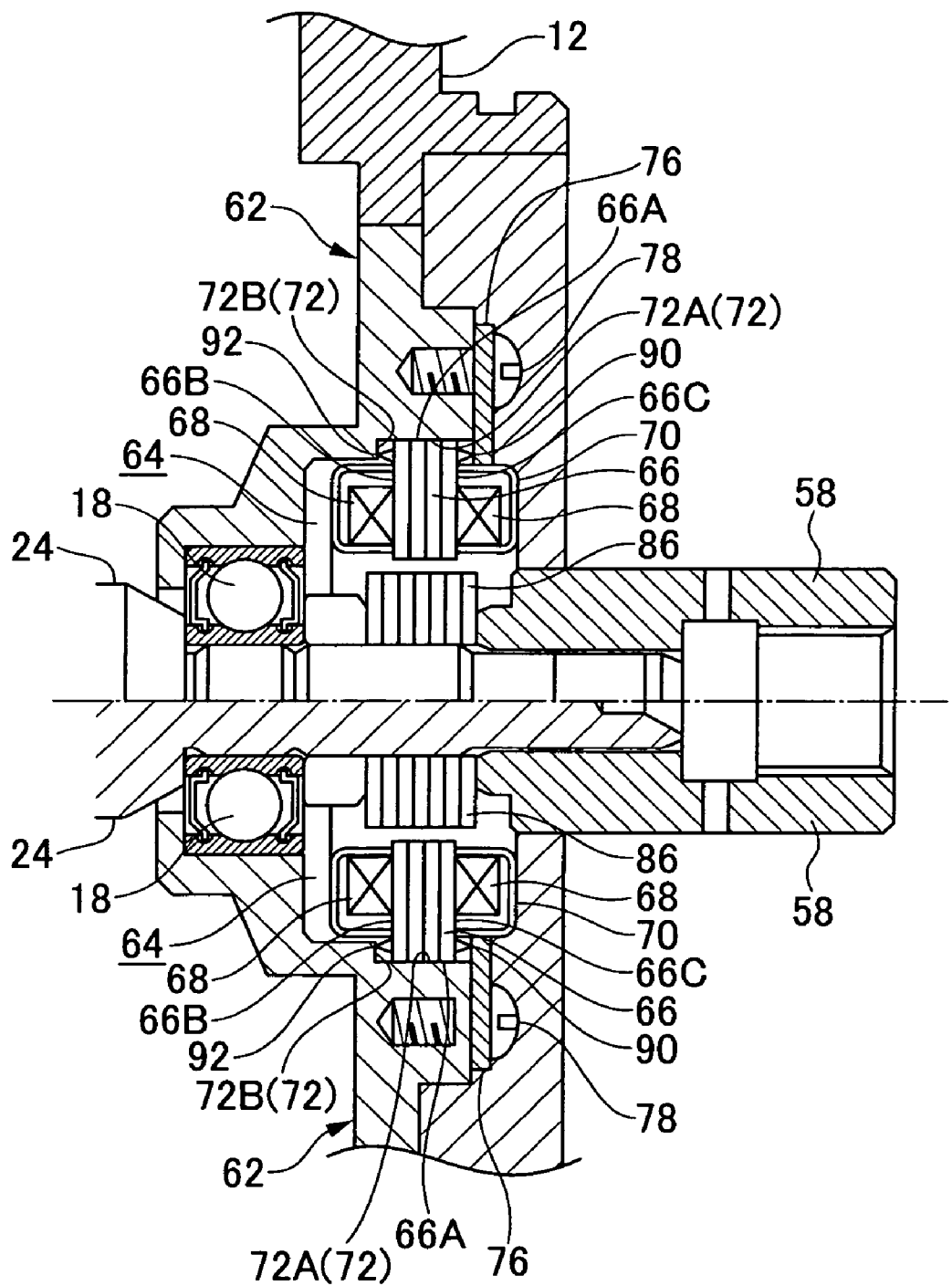
FIG. 6 is a partial cross sectional view showing a modified embodiment of the main portion of the dynamo-electric machine in accordance with an embodiment of the present invention.
Figure 7:
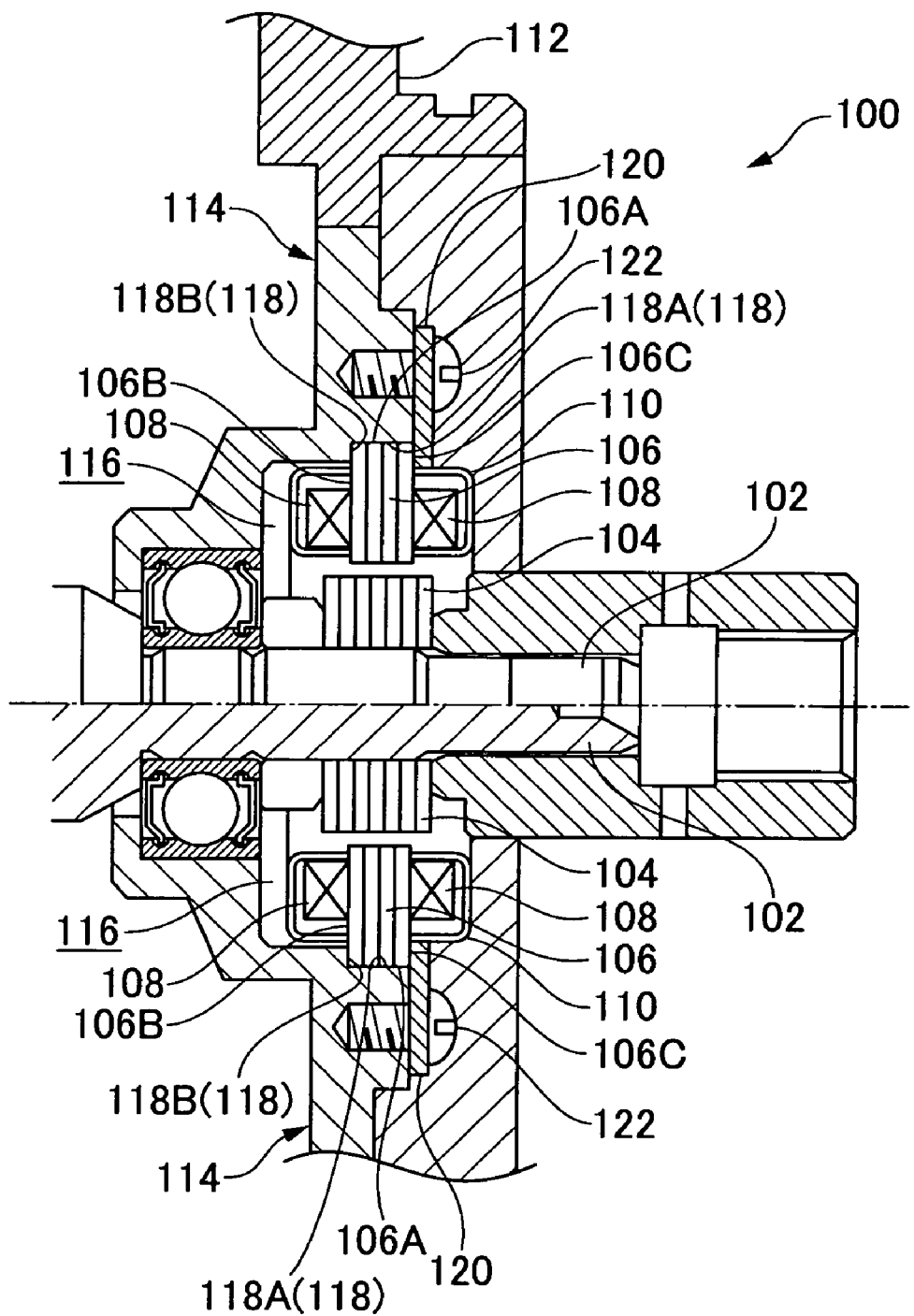
FIG. 7 is a partial cross sectional view of a conventional dynamo-electric machine.

Further, the description is given by exemplifying the structure in which the elastic ring 74 is interposed between the vertical surface portion 72B constructing the concave portion 64 of the resolver stator portion side attaching portion 62 and the side surface 66B in one side of the resolver stator portion 66, however, the structure is not limited to this structure. The structure may be made, for example, as shown in FIG. 6, such that an elastic ring 92 is interposed between the vertical surface portion 72B constructing the concave portion 64 of the resolver stator portion side attaching portion 62 and the side surface 66B in one side of the resolver stator portion 66, and between the cover member 76 and the side surface 66C in the other side of the resolver stator portion 66. In accordance with the structure mentioned above, in the case that the dimensional error is generated in the bottom surface portion 72A or/and the vertical surface portion 72B constructing the concave portion 64, it is also possible to prevent the positional accuracy of the resolver stator portion 66 and the coil portion 68 from being lowered with respect to the resolver rotor portion 86, by elastically deforming two elastic rings 92, and it is possible to accurately detect the rotational angle (the relative rotational position) of the motor 10 (the shaft 24). In particular, since a sum of the elastic deforming amounts of the respective elastic rings 92 is increased by interposing two elastic rings 92, even in the case that the large dimensional error is generated in the bottom surface portion 72A or/and the vertical surface portion 72B constituting the concave portion 64, it is possible to absorb the dimensional error.

In accordance with a first aspect of one or more embodiments of the present invention, there is provided an attaching structure of a resolver for attaching the resolver detecting a rotational angle of a motor to the motor, wherein a rotor of the resolver is attached to a shaft of the motor, and a stator of the resolver is attached to an attaching portion formed at a position facing to the rotor via a dimensional error absorbing means for absorbing a dimensional error of the attaching portion.

Advantageously, since the stator of the resolver is attached to the attaching portion formed at the position facing to the rotor of the resolver via the dimensional error absorbing means, the dimensional error of the attaching portion can be absorbed by the dimensional error absorbing means even in the case that the dimensional error is generated in the attaching portion. As a result, even in the case that the dimensional error is generated in the attaching portion, it is possible to prevent the positional accuracy of the stator from being lowered with respect to the rotor, and it is possible to accurately detect the rotational angle of the motor.

In accordance with a second aspect of one or more embodiments of the present invention, there is provided an attaching structure of a resolver as recited in the first aspect, wherein the attaching portion has a positioning surface extending in a direction approximately orthogonal to an axial direction of the shaft, the end surface in one side in the axial direction of the stator is brought into contact with the positioning surface via the dimensional error absorbing means, and the end surface in the other side in the axial direction of the stator is brought into contact with a cover member attached to the attaching portion.

Advantageously, since the end surface in one side in the axial direction of the stator is brought into contact with the positioning surface via the dimensional error absorbing means, and the end surface in the other side in the axial direction of the stator is brought into contact with the cover member, it is possible to effectively absorb the dimensional error of the attaching portion by the dimensional error absorbing means even in the case that the dimensional error is generated in the dimension in the shaft axial direction of the attaching portion.

In accordance with a third aspect of one or more embodiments of the present invention, there is provided an attaching structure of a resolver as recited in the first aspect, wherein the attaching portion has a positioning surface extending in a direction approximately orthogonal to an axial direction of the shaft, the end surface in one side in the axial direction of the stator is brought into contact with the positioning surface, and the end surface in the other side in the axial direction of the stator is brought into contact with a cover member attached to the attaching portion via the dimensional error absorbing means.

Advantageously, since the end surface in one side in the axial direction of the stator is brought into contact with the positioning surface, and the end surface in the other side in the axial direction of the stator is brought into contact with the cover member via the dimensional error absorbing means, it is possible to effectively absorb the dimensional error of the attaching portion by the dimensional error absorbing means even in the case that the dimensional error is generated in the dimension in the shaft axial direction of the attaching portion.

In accordance with a fourth aspect of one or more embodiments of the present invention, there is provided an attaching structure of a resolver as recited in the first aspect, wherein the attaching portion has a positioning surface extending in a direction approximately orthogonal to an axial direction of the shaft, the end surface in one side in the axial direction of the stator is brought into contact with the positioning surface via the dimensional error absorbing means, and the end surface in the other side in the axial direction of the stator is brought into contact with a cover member attached to the attaching portion via the dimensional error absorbing means.

Advantageously, since the end surface in one side in the axial direction of the stator is brought into contact with the positioning surface via the dimensional error absorbing means, and the end surface in the other side in the axial direction of the stator is brought into contact with the cover member via the dimensional error absorbing means, it is possible to absorb the dimensional error of the attaching portion by two dimensional error absorbing means even in the case that the great dimensional error is generated in the dimension in the shaft axial direction of the attaching portion.

In accordance with a fifth aspect of one or more embodiments of the present invention, there is provided an attaching structure of a resolver as recited in any one of the first to fourth aspects, wherein the dimensional error absorbing means is constituted by an elastic member.

Advantageously, since the dimensional error absorbing means is constituted by the elastic member, it is possible to absorb the dimensional error of the attaching portion by elastically deforming the elastic member even in the case that the dimensional error of the attaching portion is generated.

In accordance with a sixth aspect of one or more embodiments of the present invention, there is provided an attaching structure of a resolver as recited in the fifth aspect, wherein the elastic member is constituted by metal or rubber.

Advantageously, since the elastic member is constituted by metal or rubber, it is possible to utilize the existing member as it is.

In particular, since an amount of elastic deformation is increased using rubber as the elastic member, it is possible to securely absorb a great dimensional error of the attaching portion.

In accordance with a seventh aspect of one or more embodiments of the present invention, there is provided a dynamo-electric machine having a resolver detecting a rotational angle comprising: a rotatably provided shaft; a rotor of the resolver attached to the shaft; and a stator of the resolver attached to an attaching portion formed at a position facing to the rotor via a dimensional error absorbing means.

Advantageously, since the stator of the resolver is attached to the attaching portion formed at the position facing to the rotor of the resolver via the dimensional error absorbing means, the dimensional error of the attaching portion can be absorbed by the dimensional error absorbing means even in the case that the dimensional error is generated in the attaching portion. As a result, even in the case that the dimensional error is generated in the attaching portion, it is possible to prevent the positional accuracy of the stator from being lowered with respect to the rotor of the resolver, and it is possible to accurately detect the rotational angle of the motor.

In accordance with a eighth aspect of one or more embodiments of the present invention, there is provided a dynamo-electric machine as recited in the seventh aspect, wherein the attaching portion has a positioning surface extending in a direction approximately orthogonal to an axial direction of the shaft, the end surface in one side in the axial direction of the stator is brought into contact with the positioning surface via the dimensional error absorbing means, and the end surface in the other side in the axial direction of the stator is brought into contact with a cover member attached to the attaching portion.

Advantageously, since the end surface in one side in the axial direction of the stator is brought into contact with the positioning surface via the dimensional error absorbing means, and the end surface in the other side in the axial direction of the stator is brought into contact with the cover member, it is possible to effectively absorb the dimensional error of the attaching portion by the dimensional error absorbing means even in the case that the dimensional error is generated in the dimension in the shaft axial direction of the attaching portion.

In accordance with a ninth aspect of one or more embodiments of the present invention, there is provided a dynamo-electric machine as recited in the seventh aspect, wherein the attaching portion has a positioning surface extending in a direction approximately orthogonal to an axial direction of the shaft, the end surface in one side in the axial direction of the stator is brought into contact with the positioning surface, and the end surface in the other side in the axial direction of the stator is brought into contact with a cover member attached to the attaching portion via the dimensional error absorbing means.

Advantageously, since the end surface in one side in the axial direction of the stator is brought into contact with the positioning surface, and the end surface in the other side in the axial direction of the stator is brought into contact with the cover member via the dimensional error absorbing means, it is possible to effectively absorb the dimensional error of the attaching portion by the dimensional error absorbing means even in the case that the dimensional error is generated in the dimension in the shaft axial direction of the attaching portion.

In accordance with a tenth aspect of one or more embodiments of the present invention, there is provided a dynamo-electric machine as recited in the seventh aspect, wherein the attaching portion has a positioning surface extending in a direction approximately orthogonal to an axial direction of the shaft, the end surface in one side in the axial direction of the stator is brought into contact with the positioning surface via the dimensional error absorbing means, and the end surface in the other side in the axial direction of the stator is brought into contact with a cover member attached to the attaching portion via the dimensional error absorbing means.

Advantageously, since the end surface in one side in the axial direction of the stator is brought into contact with the positioning surface via the dimensional error absorbing means, and the end surface in the other side in the axial direction of the stator is brought into contact with the cover member via the dimensional error absorbing means, it is possible to absorb the dimensional error of the attaching portion by two dimensional error absorbing means even in the case that the great dimensional error is generated in the dimension in the shaft axial direction of the attaching portion.

In accordance with an eleventh aspect of one or more embodiments of the present invention, there is provided a dynamo-electric machine as recited in any one of the seventh to tenth aspects, wherein the dimensional error absorbing means is constituted by an elastic member.

Advantageously, since the dimensional error absorbing means is constituted by the elastic member, it is possible to absorb the dimensional error of the attaching portion by elastically deforming the elastic member even in the case that the dimensional error of the attaching portion is generated.

In accordance with a twelfth aspect of one or more embodiments of the present invention, there is provided a dynamo-electric machine as recited in the eleventh aspect, wherein the elastic member is constituted by metal or rubber.

Advantageously, since the elastic member is constituted by the metal or the rubber, it is possible to utilize the existing member as it is. In particular, since an amount of elastic deformation is increased by using the rubber as the elastic member, it is possible to absorb a great dimensional error of the attaching portion.

In accordance with a thirteenth aspect of one or more embodiments of the present invention, there is provided an attaching method of a resolver for attaching the resolver detecting a rotational angle of a motor to the motor, wherein a stator of the resolver is attached to an attaching portion formed at a position facing to a rotor of the resolver via a dimensional error absorbing means, and a dimensional error of the attaching portion is absorbed by the dimensional error absorbing means.

Advantageously, since the stator of the resolver is attached to the attaching portion formed at the position facing to the rotor of the resolver via the dimensional error absorbing means, the dimensional error of the attaching portion can be absorbed by the dimensional error absorbing means even in the case that the dimensional error is generated in the attaching portion. As a result, even in the case that the dimensional error is generated in the attaching portion, it is possible to prevent the positional accuracy of the stator from being lowered with respect to the rotor, and it is possible to accurately detect the rotational angle of the motor.

In accordance with a fourteenth aspect of one or more embodiments of the present invention, there is provided an attaching method of a resolver as recited in the thirteenth aspect, wherein the attaching portion has a positioning surface extending in a direction approximately orthogonal to an axial direction of the shaft, the end surface in one side in the axial direction of the stator is brought into contact with the positioning surface via the dimensional error absorbing means, and the end surface in the other side in the axial direction of the stator is brought into contact with a cover member attached to the attaching portion.

Advantageously, since the end surface in one side in the axial direction of the stator is brought into contact with the positioning surface via the dimensional error absorbing means, and the end surface in the other side in the axial direction of the stator is brought into contact with the cover member, it is possible to effectively absorb the dimensional error of the attaching portion by the dimensional error absorbing means even in the case that the dimensional error is generated in the dimension in the shaft axial direction of the attaching portion.

In accordance with a fifteenth aspect of one or more embodiments of the present invention, there is provided an attaching method of a resolver as recited in the thirteenth aspect, wherein the attaching portion has a positioning surface extending in a direction approximately orthogonal to an axial direction of the shaft, the end surface in one side in the axial direction of the stator is brought into contact with the positioning surface, and the end surface in the other side in the axial direction of the stator is brought into contact with a cover member attached to the attaching portion via the dimensional error absorbing means.

Advantageously, since the end surface in one side in the axial direction of the stator is brought into contact with the positioning surface, and the end surface in the other side in the axial direction of the stator is brought into contact with the cover member via the dimensional error absorbing means, it is possible to effectively absorb the dimensional error of the attaching portion by the dimensional error absorbing means even in the case that the dimensional error is generated in the dimension in the shaft axial direction of the attaching portion.

In accordance with a sixteenth aspect of one or more embodiments of the present invention, there is provided an attaching method of a resolver as recited in the thirteenth aspect, wherein the attaching portion has a positioning surface extending in a direction approximately orthogonal to an axial direction of the shaft, the end surface in one side in the axial direction of the stator is brought into contact with the positioning surface via the dimensional error absorbing means, and the end surface in the other side in the axial direction of the stator is brought into contact with a cover member attached to the attaching portion via the dimensional error absorbing means.

Adantageously, since the end surface in one side in the axial direction of the stator is brought into contact with the positioning surface via the dimensional error absorbing means, and the end surface in the other side in the axial direction of the stator is brought into contact with the cover member via the dimensional error absorbing means, it is possible to securely absorb the dimensional error of the attaching portion by two dimensional error absorbing means even in the case that the great dimensional error is generated in the dimension in the shaft axial direction of the attaching portion.

In accordance with a seventeenth aspect of one or more embodiments of the present invention, there is provided an attaching method of a resolver as recited in any one of the thirteenth to sixteenth aspects, wherein the dimensional error absorbing means is constituted by an elastic member.

Advantageously, since the dimensional error absorbing means is constituted by the elastic member, it is possible to absorb the dimensional error of the attaching portion by elastically deforming the elastic member even in the case that the dimensional error of the attaching portion is generated.

In accordance with a eighteenth aspect of one or more embodiments of the present invention, there is provided an attaching method of a resolver as recited in the seventeenth aspect, wherein the elastic member is constituted by metal or rubber.

Advantageously, since the elastic member is constituted by the metal or the rubber, it is possible to utilize the existing member as it is. In particular, since an amount of elastic deformation is increased by using the rubber as the elastic member, it is possible to absorb the great dimensional error of the attaching portion.

In accordance with one or more embodiments of the present invention, it is possible to prevent an accuracy of assembling position of the resolver stator portion and the coil portion from being lowered with respect to the resolver rotor portion.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A resolver attaching structure for attaching a resolver to a motor, the resolver being configured to detect a rotational angle of the motor, wherein
a rotor of the resolver is attached to a shaft of the motor, and
a stator of the resolver is attached to an attaching portion formed at a position facing the rotor via a dimensional error absorbing means for absorbing a dimensional error of the attaching portion in both an axial and orthogonal to axial direction of the stator,
wherein
the attaching portion has a positioning surface extending in a direction approximately orthogonal to an axial direction of the shaft,
an end surface on one side in an axial direction of the stator is brought into contact with the positioning surface via the dimensional error absorbing means, and
an end surface on the other side in the axial direction of the stator is brought into contact with a cover member attached to the attaching portion,
wherein the stator is attached to a case member which accommodates a coil portion,
wherein the case member is contacted with an inner peripheral surface, which faces the shaft of the motor, of the cover member, and
wherein the dimensional error absorbing means provides a pushing force to the case member along the axial direction of the shaft via the stator.

2. A resolver attaching structure for attaching a resolver to a motor, the resolver being configured to detect a rotational angle of the motor, wherein
a rotor of the resolver is attached to a shaft of the motor, and
a stator of the resolver is attached to an attaching portion formed at a position facing the rotor via a dimensional error absorbing means for absorbing a dimensional error of the attaching portion in both an axial and orthogonal to axial direction of the stator,
wherein
the attaching portion has a positioning surface extending in a direction approximately orthogonal to an axial direction of the shaft,
an end surface on one side in an axial direction of the stator is brought into contact with the positioning surface, and
an end surface on the other side in the axial direction of the stator is brought into contact with a cover member attached to the attaching portion via the dimensional error absorbing means,
wherein the stator is attached to a case member which accommodates a coil portion,
wherein the case member is contacted with an inner peripheral surface, which faces the shaft of the motor, of the cover member, and
wherein the dimensional error absorbing means provides a pushing force to the case member along the axial direction of the shaft via the stator.

3. An attaching structure of a resolver as claimed in claim 1, wherein
the attaching portion has a positioning surface extending in a direction approximately orthogonal to an axial direction of the shaft,
an end surface on one side in an axial direction of the stator is brought into contact with the positioning surface via the dimensional error absorbing means, and
an end surface on the other side in the axial direction of the stator is brought into contact with a cover member attached to the attaching portion via the dimensional error absorbing means.

4. An attaching structure of a resolver as claimed in claim 1, wherein the dimensional error absorbing means is constituted by an elastic member.

5. An attaching structure of a resolver as claimed in claim 4, wherein the elastic member is constituted by a metal or a rubber.

6. A dynamo-electric machine having a resolver detecting a rotational angle comprising:
a rotatably provided shaft;
a rotor of the resolver attached to the shaft; and
a stator of the resolver attached to an attaching portion formed at a position facing the rotor via a dimensional error absorbing means for absorbing a dimensional error of the attaching portion in both an axial and orthogonal to axial direction of the stator,
wherein
the attaching portion has a positioning surface extending in a direction approximately orthogonal to an axial direction of the shaft,
an end surface on one side in an axial direction of the stator is brought into contact with the positioning surface via the dimensional error absorbing means, and
an end surface on the other side in the axial direction of the stator is brought into contact with a cover member attached to the attaching portion,
wherein the stator is attached to a case member which accommodates a coil portion,
wherein the case member is contacted with an inner peripheral surface, which faces the shaft of the motor, of the cover member, and
wherein the dimensional error absorbing means provides a pushing force to the case member along the axial direction of the shaft via the stator.

7. A dynamo-electric machine having a resolver detecting a rotational angle comprising:
a rotatably provided shaft;
a rotor of the resolver attached to the shaft; and
a stator of the resolver attached to an attaching portion formed at a position facing the rotor via a dimensional error absorbing means for absorbing a dimensional error of the attaching portion in both an axial and orthogonal to axial direction of the stator, wherein
- the attaching portion has a positioning surface extending in a direction approximately orthogonal to an axial direction of the shaft,
- an end surface on one side in an axial direction of the stator is brought into contact with the positioning surface, and
- an end surface on the other side in the axial direction of the stator is brought into contact with a cover member attached to the attaching portion via the dimensional error absorbing means, wherein the stator is attached to a case member which accommodates a coil portion, wherein the case member is contacted with an inner peripheral surface, which faces the shaft of the motor, of the cover member, and wherein the dimensional error absorbing means provides a pushing force to the case member along the axial direction of the shaft via the stator.

8. A dynamo-electric machine as claimed in claim 6, wherein
- the attaching portion has a positioning surface extending in a direction approximately orthogonal to an axial direction of the shaft,
- an end surface on one side in an axial direction of the stator is brought into contact with the positioning surface via the dimensional error absorbing means, and
- an end surface on the other side in the axial direction of the stator is brought into contact with a cover member attached to the attaching portion via the dimensional error absorbing means.

9. A dynamo-electric machine as claimed in claim 6, wherein the dimensional error absorbing means is constituted by an elastic member.

10. A dynamo-electric machine as claimed in claim 9, wherein the elastic member is constituted by a metal or a rubber.

11. A resolver attaching method for attaching a resolver to a motor, the resolver being configured to detect a rotational angle of the motor, wherein
- a stator of the resolver is attached to an attaching portion formed at a position facing a rotor of the resolver via a dimensional error absorbing means, and
- a dimensional error of the attaching portion in both an axial and orthogonal to axial direction of the stator is absorbed by the dimensional error absorbing means, wherein
- the attaching portion has a positioning surface extending in a direction approximately orthogonal to an axial direction of the shaft,
- an end surface on one side in an axial direction of the stator is brought into contact with the positioning surface via the dimensional error absorbing means, and
- an end surface on the other side in the axial direction of the stator is brought into contact with a cover member attached to the attaching portion, wherein the stator is attached to a case member which accommodates a coil portion, wherein the case member is contacted with an inner peripheral surface, which faces the shaft of the motor, of the cover member, and wherein the dimensional error absorbing means provides a pushing force to the case member along the axial direction of the shaft via the stator.

12. A resolver attaching method for attaching a resolver to a motor, the resolver being configured to detect a rotational angle of the motor, wherein
- a stator of the resolver is attached to an attaching portion formed at a position facing a rotor of the resolver via a dimensional error absorbing means, and
- a dimensional error of the attaching portion in both an axial and orthogonal to axial direction of the stator is absorbed by the dimensional error absorbing means, wherein
- the attaching portion has a positioning surface extending in a direction approximately orthogonal to an axial direction of the shaft,
- an end surface on one side in an axial direction of the stator is brought into contact with the positioning surface, and
- an end surface on the other side in the axial direction of the stator is brought into contact with a cover member attached to the attaching portion via the dimensional error absorbing means, wherein the stator is attached to a case member which accommodates a coil portion, wherein the case member is contacted with an inner peripheral surface, which faces the shaft of the motor, of the cover member, and wherein the dimensional error absorbing means provides a pushing force to the case member along the axial direction of the shaft via the stator.

13. An attaching method of a resolver as claimed in claim 11, wherein
- the attaching portion has a positioning surface extending in a direction approximately orthogonal to an axial direction of the shaft,
- an end surface on one side in an axial direction of the stator is brought into contact with the positioning surface via the dimensional error absorbing means, and
- an end surface on the other side in the axial direction of the stator is brought into contact with a cover member attached to the attaching portion via the dimensional error absorbing means.

14. An attaching method of a resolver as claimed in claim 11, wherein the dimensional error absorbing means is constituted by an elastic member.

15. An attaching method of a resolver as claimed in claim 14, wherein the elastic member is constituted by a metal or a rubber.

* * * * *